United States Patent
La Tour et al.

[11] Patent Number: 5,888,070
[45] Date of Patent: Mar. 30, 1999

[54] ELECTRONIC AID FOR READING PRACTICE

[76] Inventors: Kathryn E. La Tour, 4201 N. Farwell Ave., Shorewood, Wis. 53211; Thomas L. Maser, 10823 N. Ravine Ct., Mequon, Wis. 53092; Robert A. Pavlik, 115 W. Green Tree Rd., Glendale, Wis. 53217

[21] Appl. No.: 691,165

[22] Filed: Aug. 1, 1996

[51] Int. Cl.⁶ .............................. G09B 17/00; G09B 19/04
[52] U.S. Cl. ........................ 434/156; 434/178; 434/185; 434/309; 434/316; 434/317; 434/320; 434/321
[58] Field of Search ................. 434/156, 157, 434/169, 178, 185, 307 R, 308, 309, 316, 317, 319, 321

[56] References Cited

U.S. PATENT DOCUMENTS

| 3,705,271 | 12/1972 | De Bell et al. ........................ 434/320 |
| 3,829,987 | 8/1974 | Matysek . |
| 3,837,256 | 9/1974 | Gullickson . |
| 3,955,466 | 5/1976 | Goldmark . |
| 4,139,954 | 2/1979 | Yamamoto .............................. 434/185 |
| 4,321,633 | 3/1982 | Saito . |
| 4,354,841 | 10/1982 | Meeder .................................... 434/157 |
| 4,459,114 | 7/1984 | Barwick .............................. 434/307 R |
| 4,634,386 | 1/1987 | Tamaki . |
| 4,643,682 | 2/1987 | Migler . |
| 5,083,924 | 1/1992 | Cochran et al. . |
| 5,466,883 | 11/1995 | Miyashita et al. ................... 434/307 A |
| 5,473,106 | 12/1995 | Miyashita et al. ................... 434/307 A |
| 5,542,000 | 7/1996 | Semba ................................... 434/307 A |
| 5,621,182 | 4/1997 | Matsumoto ........................... 434/307 A |

Primary Examiner—Richard J. Apley
Assistant Examiner—Victor K. Hwang
Attorney, Agent, or Firm—Quarles & Brady

[57] ABSTRACT

A learning aid is provided which allows the user to selectively mute one part of a prerecorded multipart drama and substitute his or her voice for that muted part. A recorded copy of a composite of the unmuted prerecorded portions of the drama, the user's voice, and additional sound effects may thus be created. A voice sensitive microphone allows the period of time for the user's part to be flexibly varied and prerecorded control signals provide visible cues to the user that the part selected is imminent.

6 Claims, 2 Drawing Sheets

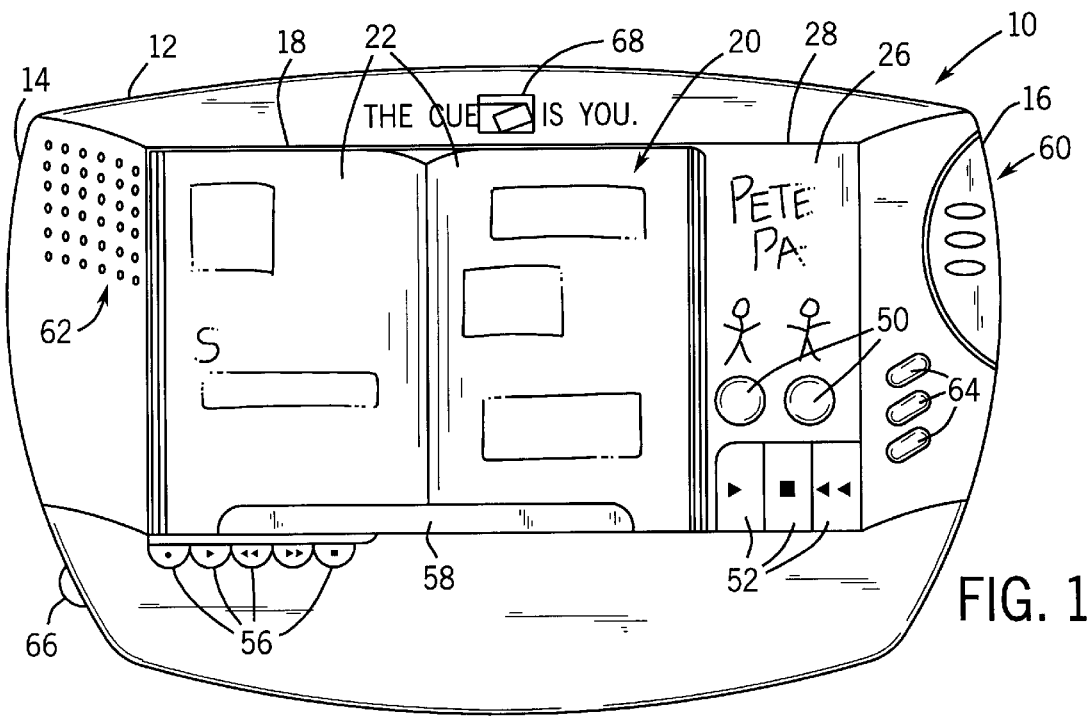
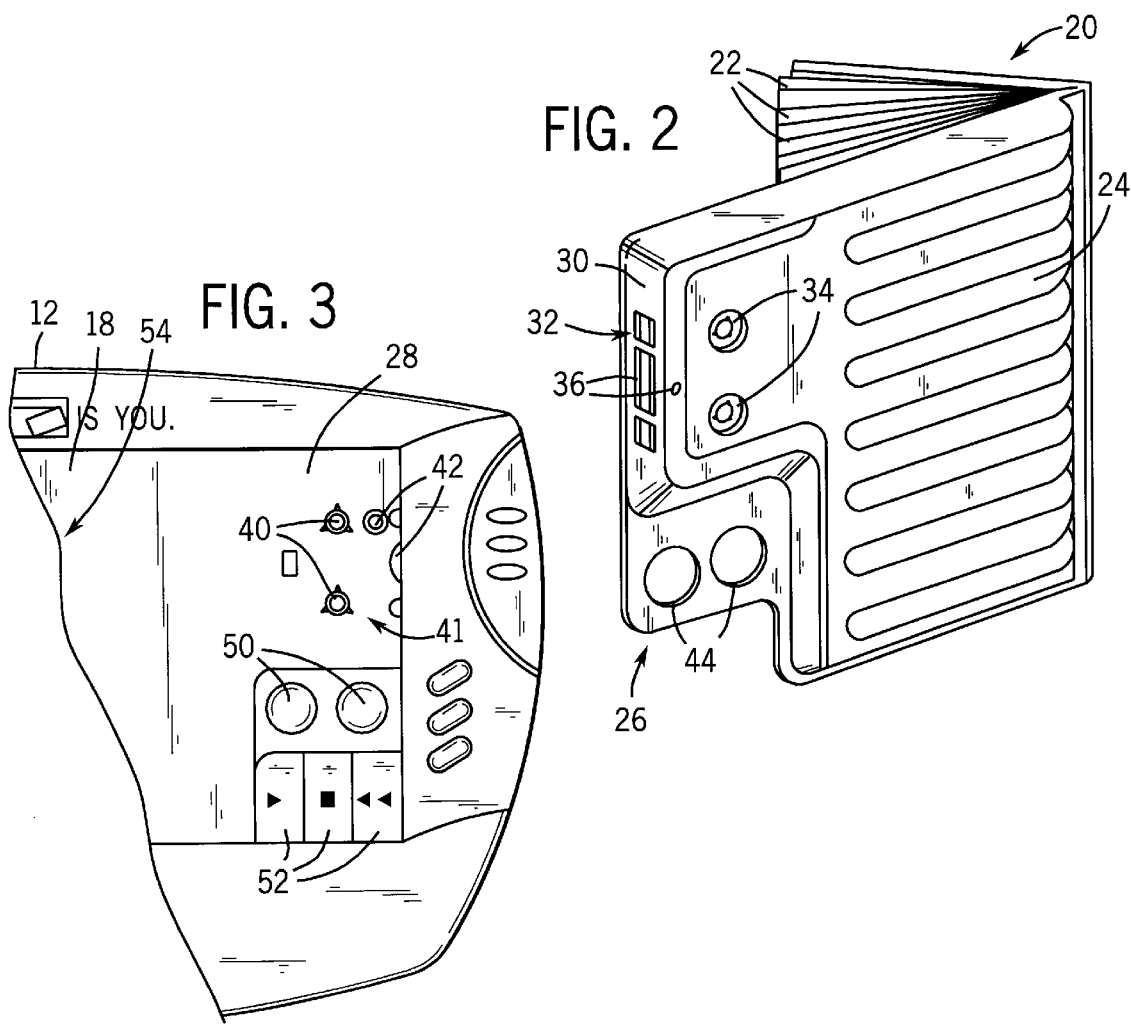

ELECTRONIC AID FOR READING PRACTICE

FIELD OF THE INVENTION

The invention relates to electronic aids for learning and, in particular, to an electronic aid that allows a reader to mute one of several parts from a prerecorded multipart drama so that the reader may read that part.

BACKGROUND OF THE INVENTION

A successful method of encouraging children to read and to enjoy the reading process allows the children to read a part of a multipart drama. The drama provides an entertaining setting for reading, allows the reader to practice expressive reading, and breaks the reading task up into easy to manage blocks of dialogue. The reader may also enjoy, like an actor, being a contributor to a larger creative whole.

Problems with such reading exercises is that they require a number of readers to be assembled in one location and further that each reader be patient and tactful with each other. For this reason, desirably the readers should be of comparable level, but if the proficiency of the group is low, the flow of the drama may be sufficiently broken so as to remove its intrinsic interest.

SUMMARY OF THE INVENTION

The present invention provides an electronic learning aid intended to duplicate the positive aspects of ensemble reading of a multipart drama for a lone individual. The learning aid includes a mechanism for playing back a prerecorded drama which allows the child to selectively mute one part that the child will read. A recording means records parts of the unmuted prerecorded drama combined with the reader's reading of the muted part to produce a recorded version of the drama with the reader's voice substituted for one of the prerecorded parts.

Specifically, the invention provides an electronic learning aid for readers using a prerecorded multipart drama and a script of the multipart drama. The learning aid includes a playback device receiving the prerecorded multipart drama and a part selector input providing an electrical signal identifying one part of the multipart drama. The part selector input, communicating with the playback mechanism, mutes the playing back of one part of the multipart drama based on the electrical signal from the part selector input. A microphone is provided so that the reader may read a part of the multipart drama selected by the part selector input. A recorder, communicating with the playback mechanism and the microphone, records the unmuted parts of the multipart drama and the input from the microphone.

Thus, it is one object of the invention to allow a reader to participate in a real-time reading of a multipart drama, reading the part of his or her choice, and to produce a lasting record of the result. The ability to select a part and to record the result provides both the interest and challenge that makes the reading enjoyable.

The prerecorded multipart drama may include embedded cue signals and the learning aid may further include a decoder circuit communicating with the playback mechanism to detect the cue signals and to provide a visual indication of an impending start of the muted part of the multipart drama.

Thus, it is another object of the invention to provide automated cue signals so that the experience of reading a multipart drama may be available to readers who may not be able to extract cues rapidly by following the script and listening to the prerecorded part.

The learning aid may include a voice detecting circuit communicating with the microphone and the playback means to stop the playback of the multipart drama for a period of time while input is being received from the microphone. This voice detecting circuit may operate with the decoder to stop the playback only when the end of the muted multipart drama is approaching and input from the microphone is still being received.

Thus, it is another object of the invention to preserve the fundamental tempo of the multipart drama, yet to provide the reader with some flexibility as to how fast the part must be read. If the reader is still speaking when the muted part is concluded, the tape stops, providing some indication to the reader to complete the part, but preventing the reader from reading over top of a following part.

The prerecorded multipart drama may be divided into multiple tracks, one track providing background sound effects.

Thus, it is another object of the invention to seamlessly integrate the reader into the drama by the use of unmuted background sound effects which continue while the reader is reading.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

BRIEF DESCRIPTION OF THE DRAWINGS

FIG. 1 is a top plan view of the learning aid of the present invention showing a script placed within the learning aid, a portion of the cover of the script providing legends for buttons that select a part the reader is to read;

FIG. 2 is a perspective view of the script of FIG. 1 showing a pocket on the cover of the script holding a prerecorded multi-track tape;

FIG. 3 is a fragmentary view similar to that of FIG. 2 showing the learning aid with the script removed to reveal a conventional cassette tape drive mechanism.

DETAILED DESCRIPTION OF THE PREFERRED EMBODIMENT

Figure 4:
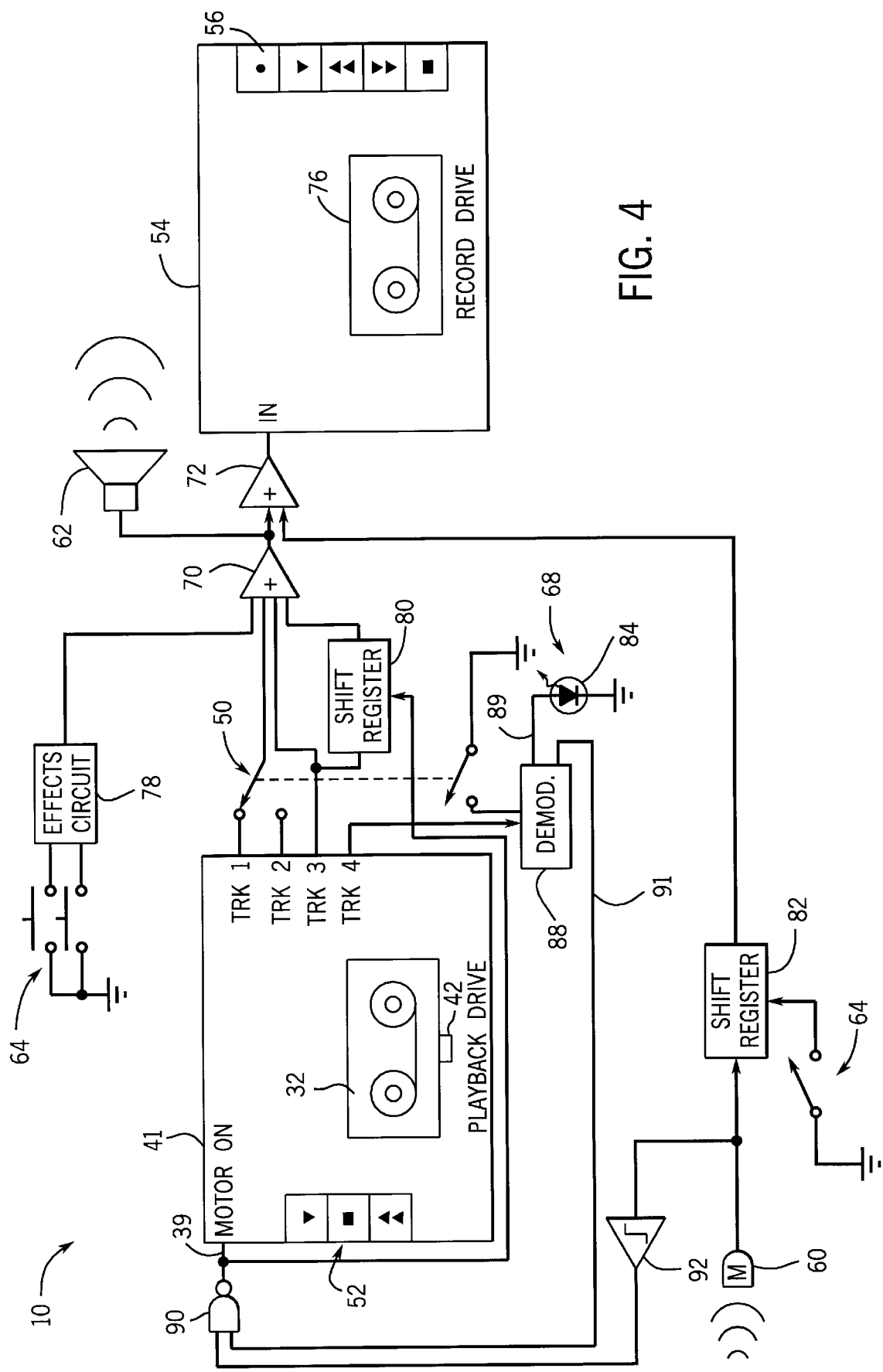
FIG. 4 is a schematic block diagram showing the circuitry for selecting a muted part of the multipart drama and blending it with a spoken part by a reader together with special effect sounds.

Referring now to FIG. 1, a learning aid 10 of the present invention provides a housing 12 sized to fit on a desk or in a student's lap, the housing having left and right hand grips 14 and 16 flanlking a central pocket 18. The pocket 18 is sized to receive a booklet 20 containing a script for a multipart children's drama.

The booklet 20 includes pages 22 bound at a central spine. The spine is arranged to extend from the top to the bottom of the pocket 18 approximately halfway across the housing 12 when the booklet 20 is placed within the pocket 18.

Referring also to FIG. 2, the rear cover 24 of the booklet 20 extends outward beyond the pages 22 to provide a wing tab 26 which fits into an outboard pocket 28 to the right of the pocket 18 holding the body of the book 20. The wing tab 26 supports a partially closed container 30 holding a standard magnetic tape cartridge 32 (partially visible in FIG. 2) such as is well know in the art. The container 30 is pierced by two tape drive apertures 34 on the side of the rear cover 24 away from the pages 22 to expose the tape hubs of the tape cartridge 32. Additional apertures 36 expose the tape of the tape cartridge 32 and provide openings for the capstan drive such as is well known in the art. The container 30 ensures that the tape cartridge 32 is at all times attached to the booklet 20 to prevent it from being misplaced.

Referring now also to FIG. 3, extending upward from the outboard pocket 28 are tape drive axles 40 which may be received within apertures 34 when the booklet 20 is placed within the housing 12 as described to engage the tape hubs of the tape cartridge 32. A capstan and tape head 42 may then be received within the apertures 36 so that the tape cartridge 32 contained within the container 30 may be played.

When the booklet 20 is positioned within the pocket 18, and the container 30 within the outboard pocket 28, the wing tab 26 extends downwardly to position two button apertures 44 in the wing tab 26 over character selection buttons 50 attached to the housing 12 below the outboard pocket 28. The front side of the wing tab 26 above the button apertures 44 is printed with the names and pictures of particular characters in the script of the booklet 20. Pressing the button 50 associated with a particular character printed on the wing tab 26 mutes that character's part on the tape cartridge 32 as will be described further below.

Beneath the character selection buttons 50 and not covered by the wing tab 26, are conventional tape recorder playback controls 52 providing for forward, stop and rewind functions of a tape player 41 such as is well known in the art.

The container 30 attached to the booklet 20 may be constructed of molded thermoplastic and assembled by conventional techniques then attached to the wing tab 26 which may be of cardboard stock typically used for book binding.

Referring again to FIG. 1, held within the housing 12 beneath the pocket 18 under the left side flap of the booklet 20 is a conventional tape recorder 54 having its recording controls 56 exposed beneath the pocket 18 in the upper surface of the housing 12 and including conventional pause, forward, rewind, fast forward and record buttons as are well understood in the art.

A flexible plastic finger 58 extends over the pocket 18 near the bottom of the pocket 18 to serve to retain the booklet 20 in an open position at a particular page. The flexible plastic finger 58 may flex backward to allow the pages to be turned.

The right hand grip 16 supports a microphone 60 positioned to be unobstructed when the reader's hands grab the grip 16. The left grip 14 holds a speaker 62 likewise positioned to be exposed during normal holding of the housing 12 and removed from the microphone 60 to prevent acoustic interference. A power switch 66 also extends from the left side grip 14. The right side grip 16 also includes two sound effect buttons operating electrical switches 64 and the upper edge of the housing 12 supports a backlit cue display 68 of a clapper board which may be selectively illuminated to provide cues to the reader. The operation of these elements will be described in more detail below.

To begin use of the learning aid 10, the booklet 20 is placed within the housing 12, this act inserting the tape cartridge 32 into the tape player 41. Power switch 66 is turned on, providing power to the internal circuitry, and the playback drive is put into play mode by pressing the appropriate playback control 52. The first page of the booklet 20 and the prerecorded tape cartridge 32 instruct the reader to select a character to read and to press one of the buttons 50 to identify that character. As will be described in more detail below, henceforth that character's voice is muted and the reader may read the part of that character into the microphone 60.

The tape cartridge 32 then instructs the user to insert a recording tape into the tape recorder 54 and to start the recording tape recorder 54 by pressing the record button of the recording controls 56.

The reader may now follow along with the prerecorded multipart drama reading the script in booklet 20 until the character the reader has selected has a spoken part. Immediately prior to the beginning of the reader's part, the cue display 68 will begin flashing, the flashing turning to a continuous illumination when the reader should be speaking the part.

During the time that the reader is speaking, no other character will be speaking, however, sound effects will continue to play from the tape cartridge 32. When the time allotted for the spoken part of the reader's character is exhausted, the cue display 68 will again begin blinking extinguishing itself when that time has elapsed. As will be described, if the reader continues to speak, the tape player 41 is halted until the reader has concluded with reading the part.

Thus, the reader may select a particular part and read along with other prerecorded parts in a relaxed environment which nevertheless encourages the reader to maintain the tempo of the drama. A recording of the prerecorded parts minus the character the reader has selected, but plus the readers rendition of that character, is captured by the tape recorder 54.

Referring now to FIG. 4, the tape cartridge 32 in the tape player 41 is recorded with four tracks according to the following table:

TABLE I

| Track Number | Content |
| --- | --- |
| Track 1 | Character 1 |
| Track 2 | Character 2 |
| Track 3 | Additional Characters and Sound Effects |
| Track 4 | Control Signals |

The tape head 42 is a four track head such as is well understood in the art and thus provides four simultaneous and separate signals (labeled TRK1–TRK4 in FIG. 4), one for each of the tracks of Table I, through the internal amplifiers of the tape player 41.

The tape player 41 includes a motor-on signal 39 which may be used to stop the motor of the tape player 41 regardless of the positions of its playback controls 52. When the motor-on signal 39 is enabled, as will initially be the case, the playback drive begins playing when its playback controls 52 are properly actuated by the user. Only one of the signals at the TRK1 and TRK2 outputs (corresponding to the selected character) will ultimately proceed to a speaker 62 and the tape recorder 54 according to the position of the characters selection switch 50.

Specifically, the character selection switch 50 is a double pole double throw switch having one throw used to connect one track (the one not selected by the user via button 50), to a summing amplifier 70. Thus, the other character is effectively muted.

Summing amplifier 70 provides an output directly to speaker 62 and to a second summing amplifier 72 whose output is received by a line input of the tape recorder 54 so that its signal may be recorded on a second recording tape 76 contained within the tape recorder 54. Also received by summing amplifier 70 is a signal from a special effects circuit which contains sound effects. The effects circuit 78 most simply is a digitized sound sample stored in a read-only memory circuit well known in the art. The read-only memory circuit communicates with a digital to analog converter to provide an analog signal to summing amplifier 70 when one of multiple switches 64 is pressed.

The summing amplifier 70 also receives track 3 (TRK3), a track which contains background sound effects and minor character parts associated with the multipart drama, but not selectable by the user.

TRK3 is also received by an analog shift register 80 which holds approximately three seconds of sound effect track for use as will be described later. The shift register 80 provides an output to the summing amplifier 70 which is normally off and thus is not transmitted to speaker 62.

Thus, the speaker 62 receives the sum of the special effects sounds from effects circuit 78 one of the TRK1 and TRK2 via switch 50 and the sound effect/minor character recording of TRK3.

The summing amplifier 70 does not receive input from the microphone 60 so as to eliminate audio feedback problems. Instead, microphone 60, after passing through second analog shift register 82 whose use will also be described below, is received by the second summing amplifier 72 to be summed with the output of the summing amplifier 70 and thus to permit a recording of the prerecorded characters and background sounds, the sound effects, and the spoken part by the user via microphone 60.

Shift register 82 provides for a pitch shifting of the spoken character's voice according to techniques well known in the art when one of switches 64' is pressed. As will be understood to those of ordinary skill in the art, the shift register 82 receives samples of the signal from the microphone 60 and plays back those samples at a higher or a lower rate to summing amplifier 72 thus giving the speaker's voice a higher "chipmunk-like" or lower "bear-like" quality.

The fourth track TRK4 does not contain audio program material at all but instead frequency encoded tones which serve to trigger certain actions of the learning aid 10. These tones are received by a demodulating circuit 88 which interprets them according to the following table.

TABLE II

| Control Signal | Lamp Output (89) | Motor Output (91) |
|---|---|---|
| Tone 0 or 1(intermittent) | Blinking lamp | Motor-on (low) |
| Tone 0 or 1 (continuous) | Lamp on continuous | Motor-on (low) |
| Tone 2 or 3 (intermittent) | Lamp blinking | Motor-on (low) |
| Tone 2 or 3(continuous) | Lamp on continuous | Motor off (high) |

The second pole of the switch 50 previously described for selecting the character that the user will read is also connected to the demodulator to provide an indication of which set of control signals it will use. Tones 0 and 2 are used to provide a cue for one character, and tones 1 and 3 are used for the other character.

Depending on which character has been selected, one pair of tones control the lamp signal 89 which is connected to an LED 84 forming the cue display 68 which blinks or illuminates continuously to provide the cues to the user of the learning aid 10 as has been previously described.

A motor output 91 also generated by the demodulator 88 according to the Table II and, the character selected by the user, is connected to a motor control NAND gate 90 whose output, when combined with a second signal from a threshold detector 92, provides the motor-on signal 39. The threshold detector 92 determines whether the user is speaking into the microphone 60 or not.

Normally, the motor-on signal 39 will remain high during the entire operation of the learning aid 10. If, however, the end of a speaking part is reached indicated by a continuous tone 2 or 3, then the motor output 91 goes high. If the user is also speaking into the microphone 60, indicating that he or she has not completed the assigned part in the time allotted, the threshold detector 92 also provides a high signal to the gate 90 which turns the motor in the tape player 41 off until such time as the user concludes speaking.

The same motor-on signal 39 used to control the motor in the tape player 41 can be used to control the shift register 80 previously described to cause that shift register 80 to begin looping the last three seconds of sound track material (TRK3) and providing it to the summing amplifier 70 via its output. This continues the background sound and to avoid a break in the apparent continuity of the drama.

Alternatively, the signal to the shift register 80 from the gate 90 may be used to mute the sound track gradually during the intermittent portion of tone 2.

At the conclusion of the prerecorded drama, the user of the learning aid 10 is instructed to rewind the tape and remove the recording tape 76 which then contains a complete version of the multipart drama substituting the user of the learning aid 10 for one of the parts. This tape may be played back for the enjoyment of the user or others.

It will be recognized that the record drive in an alternative embodiment of tape recorder 54 could be replaced by an additional track on the tape player 41 if the feature of pausing the playback drive were to be eliminated. Further, it will be understood that the playback means should be considered to include not only magnetic tape, but other equivalent structures such as direct storage in digital RAM or disk drives in a computer implementation or the like as such devices become cost effective.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made:

I claim:

1. An electronic learning aid for readers using an audio prerecorded multipart drama medium, the multipart drama having multiple spoken parts, the learning aid comprising:

a script providing a transcription of spoken parts of the multipart drama;

a playback means receiving the prerecorded multipart drama medium for playing of the multipart drama;

a part selector switch identifying a selected one part of the multipart drama;

a part selector communicating with the playback means and the part selector switch to play back parts of the multipart drama other than the selected one part of the multipart drama selected by the switch;

a microphone providing a vocal input signal; and a recording means communicating with the playback means and the microphone to record the parts of the multipart drama other than the selected one part of the multipart drama and the vocal input signal from the microphone;

whereby a reader may read a part of the multipart drama and produce a complete recording of the drama; and further including a threshold detector circuit communicating with the microphone and the playback means, the threshold detector circuit providing an electrical signal stopping the playing of the multipart drama for a period of time while the vocal input signal is being received from the microphone.

2. The electronic learning aid of claim 1 wherein the prerecorded multipart drama includes embedded cue signals and wherein the learning aid further includes a decoder communicating with the playback means to detect the cue signals and to provide a visual indication of an impending start of the selected one part of the multipart drama, and wherein the threshold detector circuit stops the playback of the multipart drama for a period of time while the vocal input signal is being received from the microphone.

3. An electronic learning aid for readers using a prerecorded multipart drama medium divided into at least three tracks, a first and second track containing different spoken parts of the multipart drama and a third track containing non-spoken background sound effects, the learning aid comprising:

a script providing a transcription of spoken parts of the multipart drama;

a playback means receiving the prerecorded multipart drama medium for playing the three tracks of the multipart drama;

a part selector switch identifying one part of the multipart drama;

a part selector communicating with the playback means and the part selector switch to select one of the first and second tracks of the multipart drama containing other than the one part identified;

a microphone providing a vocal input signal;

a speaker communicating with the playback means to broadcast the selected track and the third track;

a recording means communicating with the playback means and the microphone to record the selected track and the third track and the vocal input signal from the microphone; and whereby a reader may read a part of the multipart drama and produce a complete recording of the drama; and further including a threshold detecting circuit communicating with the microphone and the playback means, the threshold detecting circuit stopping the playing of the selected track of the multipart drama for a period of time while the vocal input signal is being received from the microphone, but continuing a playing of the third track of background sounds.

4. The electronic learning aid of claim 3, including a pitch shifter communicating with the microphone to shift the frequency of a voice signal received by the microphone prior to it being received by the speaker and recording means.

5. An electronic learning aid for readers comprising:

a script for a multipart drama;

a binding for the script having a container pocket;

a prerecorded tape of the multipart drama fitting within the container pocket;

a playback mechanism receiving and playing the prerecorded multipart drama tape as contained in the container pocket;

a part selector switch identifying one part of the multipart drama tape;

a part selector communicating with the playback mechanism and the part selector switch to mute the playing of the one part of the multipart drama tape; and a microphone providing a vocal input signal;

a recording means communicating with the playback mechanism and the microphone to record unmuted parts of the multipart drama tape and the vocal input signal from the microphone; and whereby a reader may read a part of the multipart drama and produce a complete recording of the drama.

6. An electronic learning aid for readers using an audio prerecorded multipart drama medium, the multipart drama having multiple spoken parts, the learning aid comprising:

a playback means receiving the prerecorded multipart drama medium for playing of the multipart drama;

a part selector switch identifying one part of the multipart drama;

a part selector communicating with the playback means and the part selector switch to playback parts of the multipart drama other than the one part of the multipart drama selected by the switch;

a microphone providing a vocal input signal;

including a threshold detector circuit communicating with the microphone and the playback means, the threshold detector circuit providing an electrical signal stopping the playing of the multipart drama for a period of time while the vocal input signal is being received from the microphone.

* * * * *